United States Patent
Chen

(10) Patent No.: US 10,907,786 B2
(45) Date of Patent: Feb. 2, 2021

(54) RGB SYNCHRONOUS INTELLIGENT LIGHT STRING

(71) Applicant: JIANGSU LEDCO LIGHTING TECH CO., LTD., Jiangsu (CN)

(72) Inventor: Genhai Chen, Yancheng (CN)

(73) Assignee: JIANGSU LEDCO LIGHTING TECH CO., LTD., Jiangsu (CN)

( * ) Notice: Subject to any disclaimer, the term of this patent is extended or adjusted under 35 U.S.C. 154(b) by 0 days.

(21) Appl. No.: 16/643,096

(22) PCT Filed: Feb. 8, 2018

(86) PCT No.: PCT/CN2018/075732
§ 371 (c)(1),
(2) Date: Feb. 28, 2020

(87) PCT Pub. No.: WO2019/148523
PCT Pub. Date: Aug. 8, 2019

(65) Prior Publication Data
US 2020/0200343 A1 Jun. 25, 2020

(30) Foreign Application Priority Data
Jan. 31, 2018 (CN) .......................... 2018 1 0097777

(51) Int. Cl.
*H05B 37/00* (2006.01)
*F21S 10/02* (2006.01)
(Continued)

(52) U.S. Cl.
CPC ................. *F21S 10/02* (2013.01); *F21S 4/15* (2016.01); *F21V 23/003* (2013.01); *F21V 23/06* (2013.01);
(Continued)

(58) Field of Classification Search
CPC .......... F21Y 2113/10; F21V 29/70; H02J 4/00
See application file for complete search history.

(56) References Cited

U.S. PATENT DOCUMENTS

| 5,716,124 A * | 2/1998 | Hsu .......................... F21S 4/10 362/123 |
| 6,086,222 A * | 7/2000 | Juba ......................... F21S 4/10 362/123 |

(Continued)

FOREIGN PATENT DOCUMENTS

| CN | 200952659 Y | 9/2007 |
| CN | 101636023 A | 1/2010 |
| CN | 206222050 U | 6/2017 |

OTHER PUBLICATIONS

International Search Report for PCT/CN2018/075732, dated Nov. 6, 2018, 4 pages.
(Continued)

*Primary Examiner* — Thuy Vinh Tran
(74) *Attorney, Agent, or Firm* — Patterson Thuente Pedersen, PA

(57) ABSTRACT

A RGB synchronous intelligent light string assembly comprises, electrically connected, an intelligent power supply including an IP44 plug and a controller, a main wire and light strings connected in parallel thereto, wherein one end of an IP44 plug is connected to a 220 V power supply and the other end connected to a fuse, a varistor, a filter, and a filtering circuit; the filtering circuit is connected to a MOSFET and a DC-DC transformer outputting a direct current with an altered voltage to a driving module and a FET; the FET is connected with a program module, a remote-control module, a WiFi & Bluetooth module; a signal output by the FET passes through a driving module; the driving module and the DC-DC transformer are connected to a main wire end through the MOSFET. The assembly simultaneously
(Continued)

controls colors of the light strings to promote decorative effect.

6 Claims, 6 Drawing Sheets

(51) Int. Cl.

| | |
|---|---|
| *F21S 4/15* | (2016.01) |
| *H05B 45/20* | (2020.01) |
| *H05B 47/19* | (2020.01) |
| *H05B 45/37* | (2020.01) |
| *H05B 47/155* | (2020.01) |
| *F21V 23/00* | (2015.01) |
| *F21V 23/06* | (2006.01) |
| *F21Y 113/13* | (2016.01) |
| *F21Y 103/10* | (2016.01) |
| *F21Y 115/10* | (2016.01) |
| *F21W 121/00* | (2006.01) |
| *H02J 4/00* | (2006.01) |
| *F21Y 113/10* | (2016.01) |
| *F21V 29/70* | (2015.01) |

(52) U.S. Cl.
CPC ............ *H05B 45/20* (2020.01); *H05B 45/37* (2020.01); *H05B 47/155* (2020.01); *H05B 47/19* (2020.01); *F21V 29/70* (2015.01); *F21W 2121/006* (2013.01); *F21Y 2103/10* (2016.08); *F21Y 2113/10* (2016.08); *F21Y 2113/13* (2016.08); *F21Y 2115/10* (2016.08); *H02J 4/00* (2013.01)

(56) References Cited

U.S. PATENT DOCUMENTS

| | | | | |
|---|---|---|---|---|
| 7,249,866 | B1 * | 7/2007 | Tai | F21V 21/008 |
| | | | | 362/147 |
| 9,408,273 | B2 * | 8/2016 | Wee | H02H 11/002 |
| 9,845,925 | B2 * | 12/2017 | Chen | H01R 25/003 |
| 2005/0254242 | A1 * | 11/2005 | Baker | F21S 4/10 |
| | | | | 362/249.16 |
| 2008/0049424 | A1 * | 2/2008 | Wang | F21V 23/06 |
| | | | | 362/249.01 |
| 2012/0086349 | A1 * | 4/2012 | Segan | H05B 45/00 |
| | | | | 315/187 |
| 2015/0211696 | A1 * | 7/2015 | Cheng | F21S 4/10 |
| | | | | 362/249.08 |
| 2018/0202619 | A1 * | 7/2018 | Dedene | F21V 23/06 |

OTHER PUBLICATIONS

English translation of International Search Report for PCT/CN2018/075732, dated Nov. 6, 2018, 2 pages.

* cited by examiner

RGB SYNCHRONOUS INTELLIGENT LIGHT STRING

CROSS-REFERENCE TO RELATED APPLICATIONS

This application is a National Phase Entry of PCT Application No. PCT/CN2018/075732 filed Feb. 8, 2018, which application claims the benefit of priority to CN201810097777.2, filed Jan. 31, 2018, the entire disclosures of which are incorporated herein by reference.

TECHNICAL FIELD

The present disclosure relates to the field of decorative lighting technology, in particular, to a RGB synchronous intelligent light string assembly.

BACKGROUND

RGB synchronous intelligent light string assembly is one of the main decorations for Christmas, and indispensable decorations for consumers' festivals, culture exchanges, cultural events and lighting projects for public area nightscape.

However, the available light string assemblies on the market are not so handy to control and color switching thereof is usually performed by manually operating the program in the control box, which fail to adapt flexibly to variations in demand. Furthermore, the structure thereof is too simple to achieve a desired curtain-like or array-like decorative effect or to heighten the festival atmosphere.

SUMMARY

The present invention aims to solve the above-mentioned technical problems to some extent.

Given this, the present invention provides a RGB synchronous intelligent light string assembly. According to this disclosure, a plurality of light strings are controlled by an intelligent power supply and switched synchronously, achieving a better decorative effect and an elegant appearance.

In order to solve the above-mentioned technical problem, the invention discloses a RGB synchronous intelligent light string assembly comprising an intelligent power supply, a plurality of light strings, and a main wire, wherein the plurality of light strings are connected in parallel to the main wire, and optionally form an icicle light set, a curtain light set or a net light set. A male joint and a female joint are respectively arranged on each end of the main wire. The intelligent power supply comprises a plug, a controller, a female terminal of a power wire that are connected in sequence by electric wires, and the female terminal of the power wire is coupled with the male joint. A first end of the plug is electrically connected to a 220V power supply and a second end of the plug is connected to the controller. The controller comprises a filter, a filter circuit, a MOSFET, a DC-DC transformer, a driving module, a field effect transistor (FET), a program module, a heat dissipation component and a driving module. The filter of the controller for filtering out noise and separating signals is connected to the filter circuit which is for passing the low frequencies and attenuating the high frequencies. Outputs of the filter circuit are respectively connected to an input of the MOSFET and the DC-DC transformer. The DC-DC transformer outputs an direct current with an altered voltage to the driving module and the FET. The FET is connected to the program module. An input synchronous command of the program module for controlling the RGB synchronous light strings is converted to an output signal after processed by the FET arrives the input of the driving module through the heat dissipation component, further arrives to an input of the MOSFET and then to the plurality of light strings, with outputs of the driving module and the DC-DC transformer connected to the an input of the MOSFET.

In an embodiment, the FET is connected to a remote-control module, and a WiFi & Bluetooth module.

In an embodiment, synchronous switch of the plurality of light strings is performed by the remote-control module, the WiFi & Bluetooth module through a wireless terminal.

In an embodiment, the plurality of light strings of the icicle light set have different lengths, the plurality of light strings of the curtain light set have a uniform length while the plurality of light strings of the net light set are weaved with each other to form a net structure.

In an embodiment, the light string comprises a plurality of RGB diodes connected in series, wherein the RGB diode comprises a LED bulb and a PC housing. A chip is arranged inside the LED bulb and the LED bulb is capsulated in the PC housing by an epoxy resin.

In an embodiment, the LED diode has an outer diameter of 3 mm, 4 mm, 5 mm or 8 mm.

In an embodiment, the plug is an IP44 plug.

The technical effect that can be achieved by this present disclosure is as follows: the program module, the remote-control module and the WiFi & Bluetooth module are connected in parallel to the FET. All of the program module, the remote-control module and the WiFi & Bluetooth module can control the color switch of the light strings and thereby the color switch of the multiple light strings can be performed by one of these modules.

Moreover, a plurality of light strings can form an icicle light set, a curtain light set or a net light set, and thereby achieving the variety of the RGB synchronous intelligent light string assembly, promoting a decorative effect and rendering environment.

BRIEF DESCRIPTION OF THE DRAWINGS

FIGS. 2-1, 2-2, 2-3, 2-4 respectively shows the structural schematic diagram of a common light set, an icicle light set, a curtain light set, while and a net light set of the RGB synchronous intelligent light string assembly according to the present disclosure;

FIG. 3 is a circuit diagram of an embodiment of the present disclosure; wherein 1—light string, 2—main wire, 3—RBG diode, 4—male joint, 5—female joint, 6—PE heat shrinkable sleeve, 7—plug, 8—control unit.

DETAILED DESCRIPTION

Figure 1:
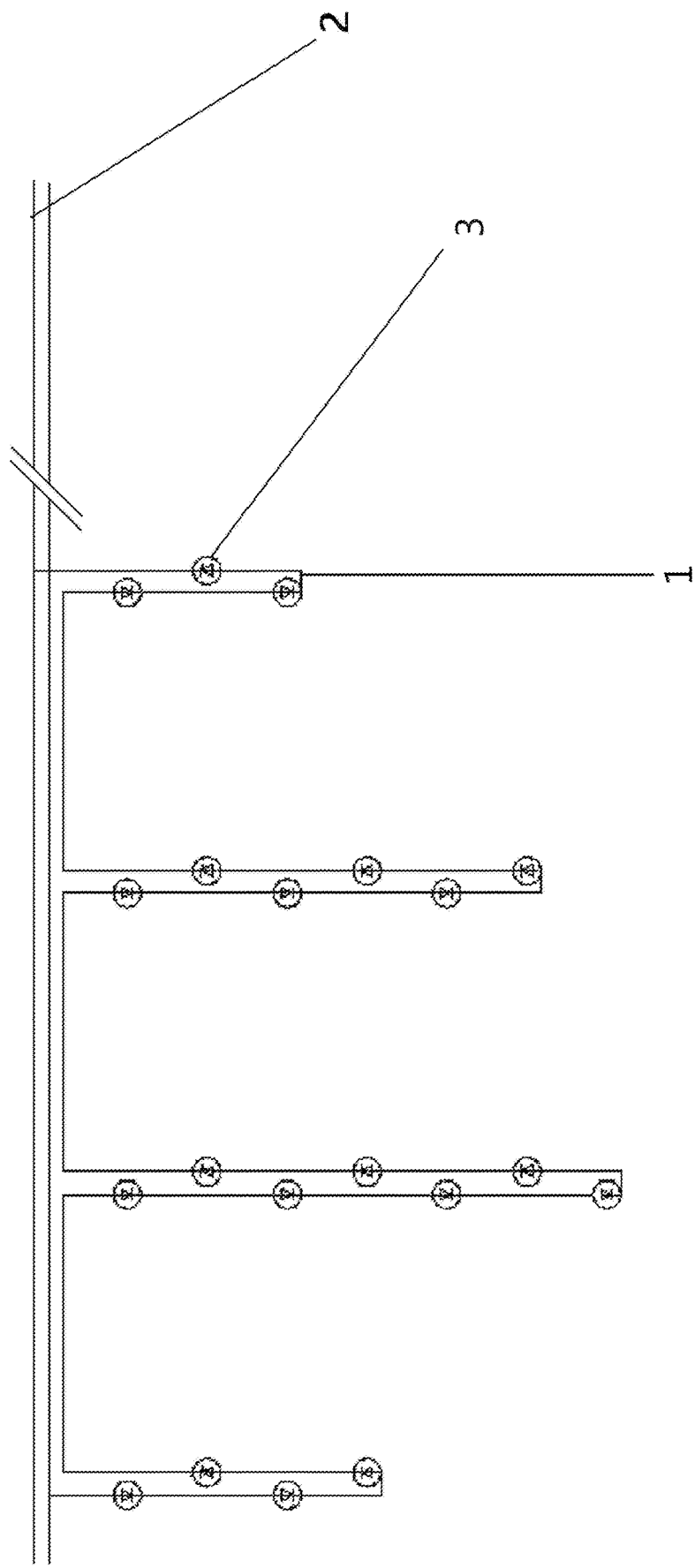
FIG. 1 is a structural schematic diagram of an embodiment of the light string assembly of the present disclosure.

The present disclosure is further described in combination with the following embodiments and the accompanying drawings so as to help the skilled in the art to better understand and practice the disclosure. However, the embodiments set forth herein should not be regarded as limitation of the present disclosure.

FIGS. 2-1, 2-2, 2-3 and 2-4 show a RBG synchronous intelligent light string assembly comprising an intelligent power supply, a plurality of light strings and a main wire, wherein the plurality of light strings are connected in parallel to the main wire.

In an embodiment of the disclosure, a plurality of light strings 1 are connected in parallel to a main wire 2. The plurality of light strings 1 extend downward and vertically and are evenly spaced along the main wire 2. Each light string 1 comprises of a plurality of RGB diodes 3 connected in series. The longest light string is located in the middle of the wire 2 and the light strings of both sides are shorter in length in sequence as being away from the longest light string. A male joint 4 is arranged on one end of the main wire 2 and a female joint 5 is arranged on the other end of the main wire 2. A PE heat shrinkable sleeve 6 is arranged outside each of the male joint 4 and female joint 5.

In another embodiment of the disclosure, the plurality of light strings 1 are connected in series to form an elegant curtain-like appearance.

Figures 1, 2:
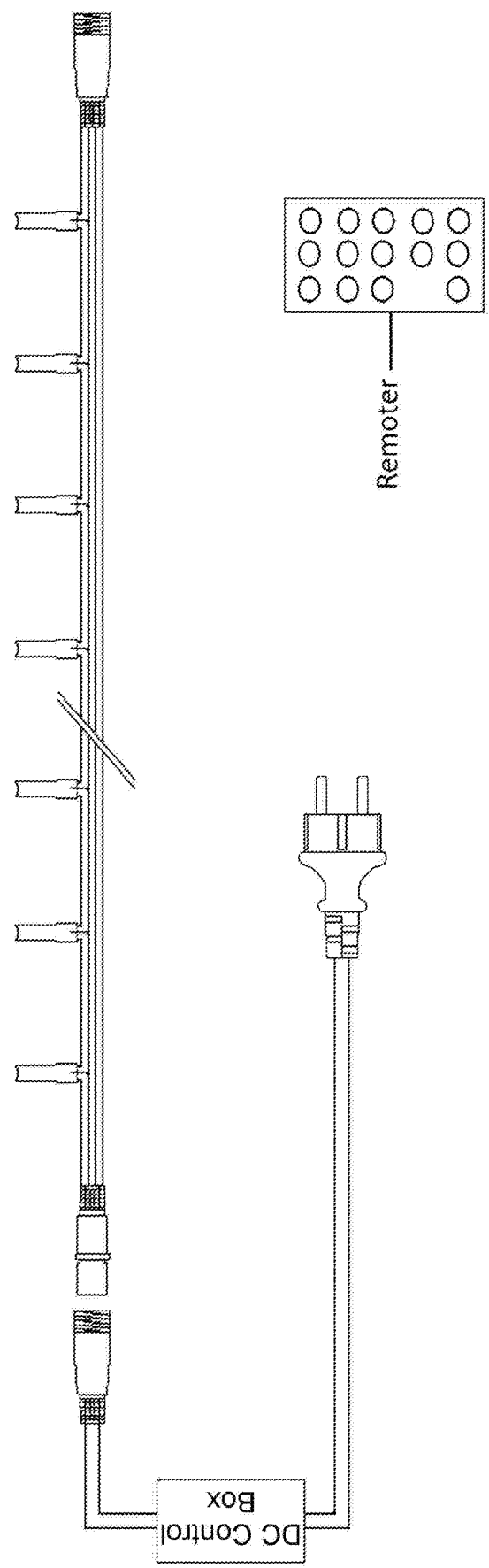
Figure 2:
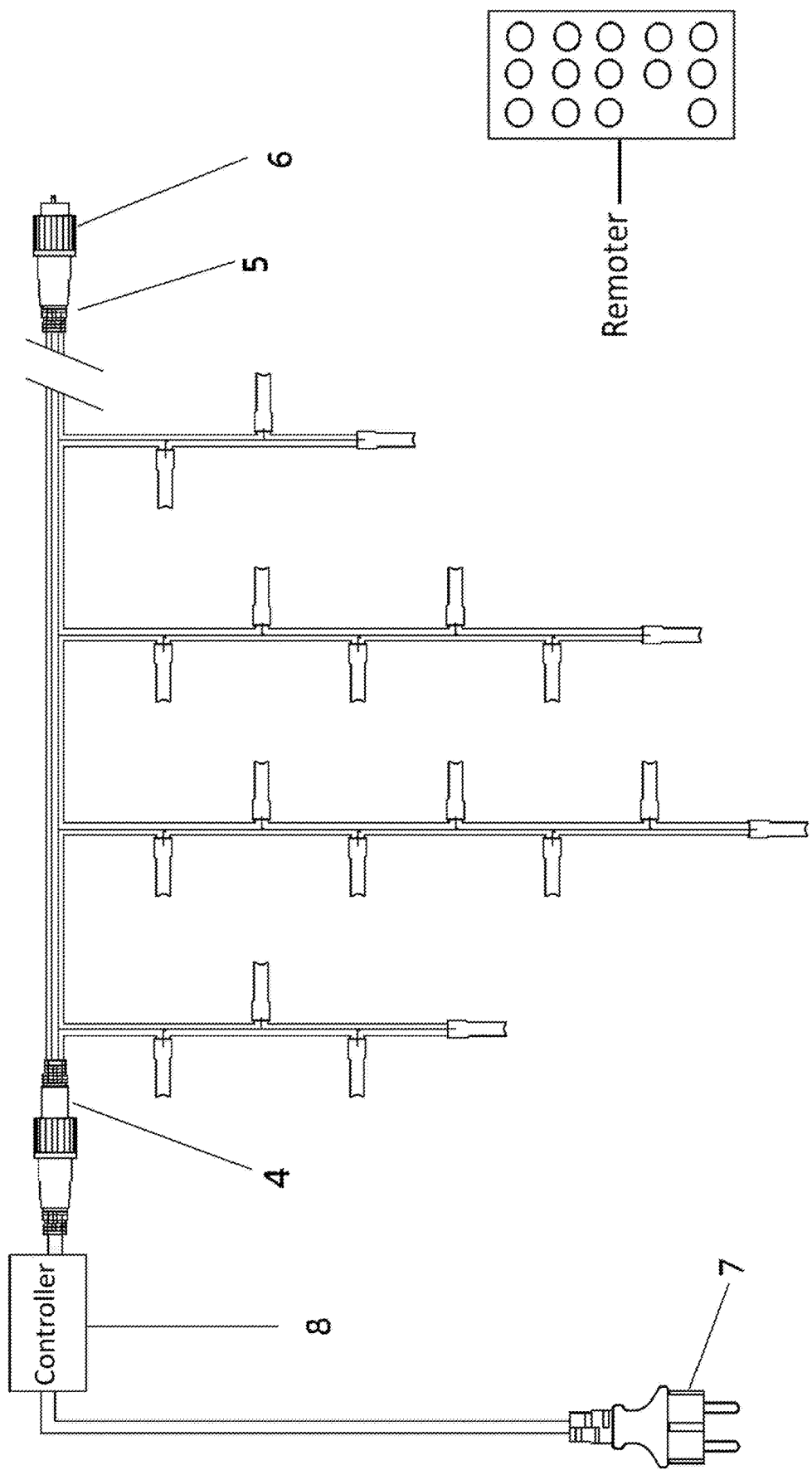
Figures 2, 3:
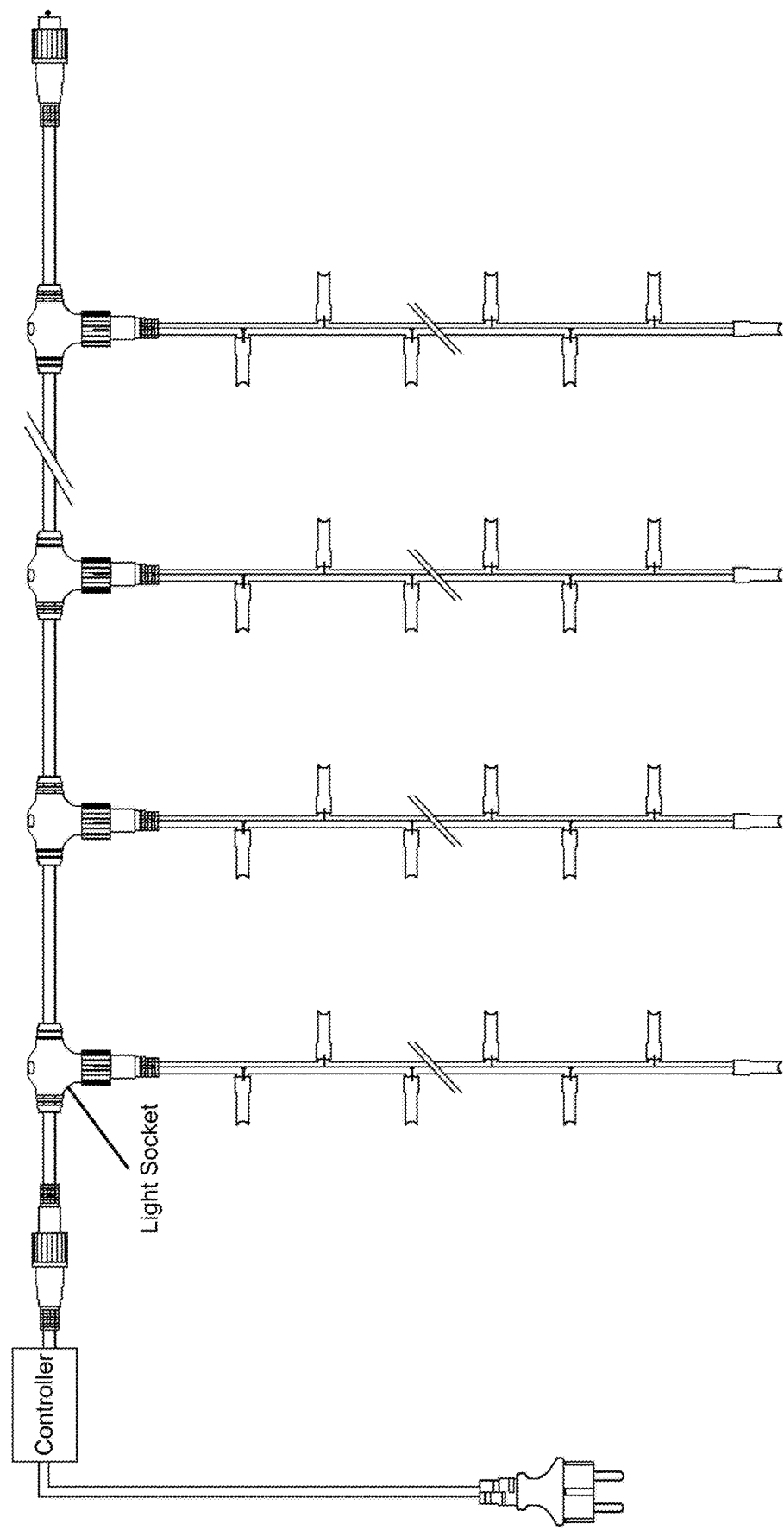
Figures 2, 3, 4:
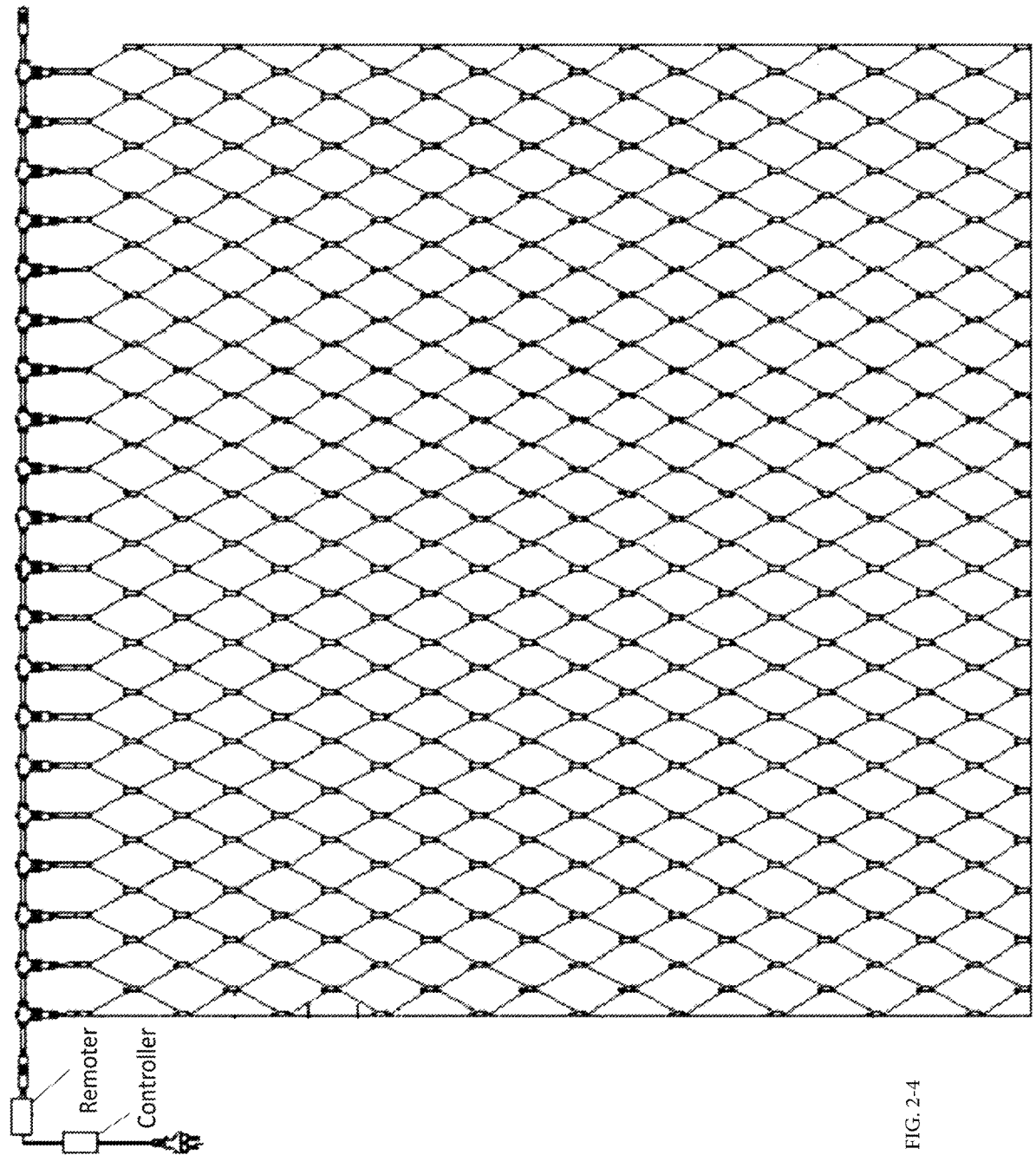
Figure 3:
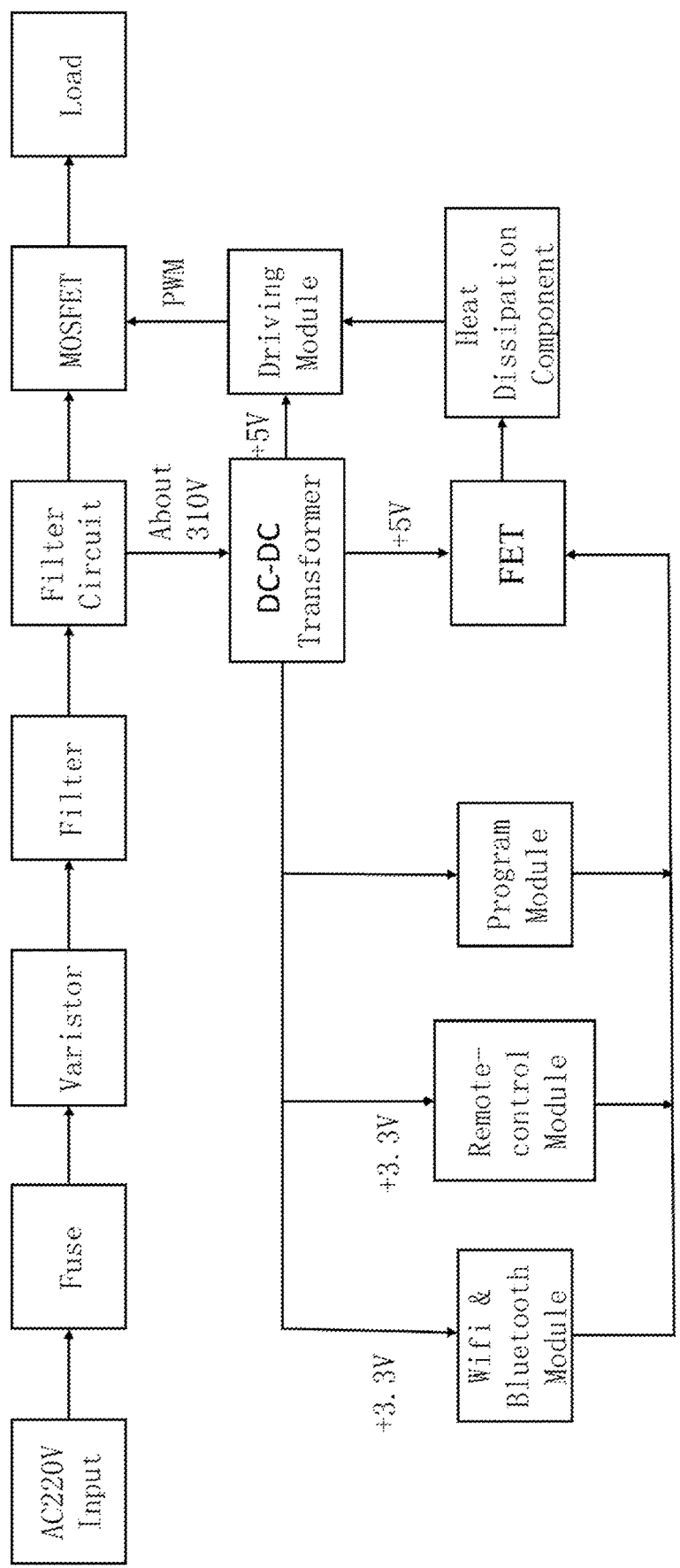

As shown in FIGS. 2 and 3, a first end of a plug 7 is electrically connected to a 220 V power supply and a second end of the plug 7 is connected to a control unit. The control unit comprises, in sequence, a fuse for current limitation, a varistor for voltage control, a filter for filtering out noise and separating signals, a filter circuit for passing the low frequencies and attenuating the high frequencies; outputs of the filter circuit are respectively connected to an input of the MOSFET and a DC-DC transformer. The DC-DC transformer outputs a direct current with an altered voltage to a driving module and a FET. The FET is connected with a program module, a remote-control module, a WiFi & Bluetooth module, these modules are all configured with switches. A signal from the FET goes through a heat dissipation component and the driving module. Both of outputs of the driving module and the DC-DC transformer are connected to an input of MOSFET while an output of MOSFET is connected to one end of the main wire.

According to an embodiment, the fuse functions as below: when the circuit malfunctions or creates anomalies, the current keeps rising and it probably destroys some crucial devices or expensive devices in the circuit. Consequently, the circuit probably burns out or even a fire can be caused. If a fuse is properly arranged, it will melt when the current abnormally increases to a certain level within a certain time, and thereby interrupting the current and allowing safe operation of the circuit.

The fuse is connected to the varistor via a circuit board and the varistor is a protective device for voltage limitation. With the non-liner characteristic of the varistor, it can clamp the voltage to a certain value when overvoltage is applied thereon in order to protect the subsequent circuit.

The varistor is connected to the filter via the circuit board. The filter is a circuit or an operating and processing system that is capable of frequency selection, and plays a role in filtering noise and separating a variety of signals.

According to an embodiment of the present disclosure, the filter is a circuit or an operating and processing system that is capable of frequency selection and plays a role in filtering noise and separating a variety of signals. Via the circuit board, the filter is connected to the filter circuit which is configured for allowing passing a current with a certain frequency or attenuating a current with a certain frequency. There are four basic filtering circuits: high-pass filter (high frequencies are passed, low frequencies are attenuated), low-pass filter (low frequencies are passed, high frequencies are attenuated), band-pass filter (only frequencies in a frequency band are passed) and band-stop (trap) filter (only frequencies in a frequency band are attenuated).

According to an embodiment of the present disclosure, the filter circuit is connected to the DC-DC transformer via the circuit board. Specifically, the input direct current is converted to an alternating current through a self-oscillating circuit, and further converted to a direct current at an altered voltage transformed by the transformer for output, or further converted to a high-voltage direct current by a voltage doubling rectifier circuit for output.

The DC-DC transformer converts the input direct current to an alternating current through a self-oscillating circuit, and further converted to a direct current at an altered voltage transformed by the transformer for output, or further converted to a high-voltage direct current by a voltage doubling rectifier circuit for output.

According to an embodiment of the present disclosure, the DC-DC transformer is connected to the FET via the circuit board. There are two main types of field-effect transistors. For metal-oxide semiconductor FET, MOS-FET for short, majority carriers participate in conducting, so it is also named as unipolar transistor, which belongs to a voltage-controlled semiconductor device and has advantages such as high input resistance (1-10Ω), low noise and low power-consumption, wide dynamic range, great facility for integration, wide safe operating region without second breakdown.

The DC-DC transformer is connected to a WiFi & Bluetooth module, a remote-control module and a program module via the circuit board. The WiFi & Bluetooth module is a PCBA integrating functions of WiFi and Bluetooth for short-range wireless communication, and it is composed of a data module and a vocal module. The WiFi & Bluetooth module is mainly used in the field of short-range data transmission and it is handy to be connected with a Bluetooth or WiFi device of a PC, a phone and a tablet computer to avoid tedious cable connecting and to take the place of serial link. The remote-control module is configured for controlling and function switching transmission while the program module refers to the component for editing or correcting the functional program file of the product.

Outputs of the WiFi & Bluetooth module, the remote-controlling module and the program module are connected to the FET via the circuit board.

Output of the FET is connected to the heat dissipation component configured as a temperature protection assembly.

Outputs of the DC-DC transformer and the heat dissipation component are connected to an input of the driving module which is configured for simulating the upper level module of the module to be test and is equivalent to the main program of the module to be test. An output of the driving module is connected to the MOSFET via the circuit board and an output of the MOSFET is connected to the load, wherein the MOSFET is a field-effect diode widely used in analog and digital circuits.

As shown in FIG. 3, the DC-DC transformer converts an alternating current to a direct current.

As also shown in FIG. 3, the WiFi & Bluetooth module is controlled via a wireless terminal.

According to an embodiment of the present disclosure, one of the switches of program module, remote-control module and the WiFi & Bluetooth module is turned off, and a closed circuit is formed.

The RBG synchronous intelligent light string assembly comprises 100 bulbs, 50 bulbs of which form one closed circuit and others form another closed circuit, and thereby the following functions can be performed:

1. Steady function:

The lights are always on and emit light of all colors, then only red, green, yellow, blue, white, pink, and light green color, switching a color every 15-30 seconds.

2. Steady-plus-flashing function:

Some lights are always on and emit light of all colors, then only red, green, yellow, blue, white, pink, and light green color, switching a color every 15-30 seconds, with the other lights flashing.

3. Flashing function:

Some lights are flashing and emit light of all colors, then only red, green, yellow, blue, white, pink, and light green color, switching a color every 15-30 seconds, with the other lights off.

4. Fade-in and fade-out function:

The lights emit light with fade-in and then fade-out brightness, and emit light of all colors, then only red, green, yellow, blue, white, pink, and light green color, switching a color every 15-30 seconds, with the other lights off.

5. Random flashing function:

Some lights are flashing and emit light of all colors, then only red, green, yellow, blue, white, pink, and light green color, switching a color every 15-30 seconds, with the other lights on or off.

6. Alternative on and off function:

All the lights are turned on and then off, and emit light of all colors, then only red, green, yellow, blue, white, pink, and light green color, switching a color every 15-30 seconds.

7. Automation function:

All the functions above are automatic and the functions 1 to 6 are auto-displayed sequentially.

8. All the functions above can be or cannot be controlled remotely.

The above embodiments are merely used to fully describe the technical solutions of the present disclosure, and are not intended to limit the scope of the present disclosure. It is understood that the present disclosure may be modified or the features may be equivalently replaced without going beyond the spirit and scope of the present disclosure. The protection scope of the invention should be defined by the attached claims.

The invention claimed is:

1. A RGB synchronous intelligent light string assembly comprising:

an intelligent power supply, a plurality of light strings, and a main wire, wherein the plurality of light strings are connected in parallel to the main wire and optionally form a structure selected from the group consisting of an icicle light set, a curtain light set or a net light set;

wherein a male joint and a female joint are respectively arranged on each end of the main wire;

wherein the intelligent power supply comprises a plug, a controller, a female terminal of a power wire that are connected in sequence by electric wires, and the female terminal of the power wire is coupled with the male joint;

wherein a first end of the plug is electrically connected to a 220V power supply and a second end of the plug is connected to the controller;

wherein the controller comprises a filter, a filter circuit, a MOSFET, a DC-DC transformer, a field effect transistor (FET), a program module, a heat dissipation component and a driving module;

wherein the filter of the controller for filtering out noise and separating signals is connected to the filter circuit configured for passing low frequencies and attenuating high frequencies;

wherein outputs of the filter circuit are respectively connected to an input of the MOSFET and the DC-DC transformer;

wherein the DC-DC transformer is configured to output a direct current with an altered voltage to the driving module and the FET which is connected to the program module;

wherein the program module is configured to control the plurality of light strings by inputting a synchronous command to the FET which outputs a signal to the input of the driving module through the heat dissipation component, and further arrives to the input of the MOSFET and the plurality of light strings, with outputs of the driving module and the DC-DC transformer connected to the input of the MOSFET.

2. The RGB synchronous intelligent light string assembly of claim 1, wherein the FET is connected to a remote-control module, and a WiFi & Bluetooth module.

3. The RGB synchronous intelligent light string assembly of claim 2, wherein the plurality of light strings are configured to be synchronously switched by the remote-control module, the WiFi & Bluetooth module through a wireless terminal.

4. The RGB synchronous intelligent light string assembly of claim 1, wherein each of the plurality of light strings comprises a plurality of RGB diodes connected in series, wherein each of the plurality of RGB diodes comprises a LED bulb and a PC housing, a chip is arranged inside the LED bulb and the LED bulb is capsulated in a polycarbonate housing by an epoxy resin.

5. The RGB synchronous intelligent light string assembly of claim 4, wherein each of the plurality of RGB diodes has an outer diameter of 3 mm, 4 mm, 5 mm or 8 mm.

6. The RGB synchronous intelligent light string assembly of claim 1, wherein the plug is an IP44 plug.

* * * * *